Aug. 28, 1934.   L. WENAR   1,971,738
UNIT PRICING OR LETTERING SYSTEM AND CARD DISPLAY HOLDER
Filed May 1, 1933   3 Sheets-Sheet 1
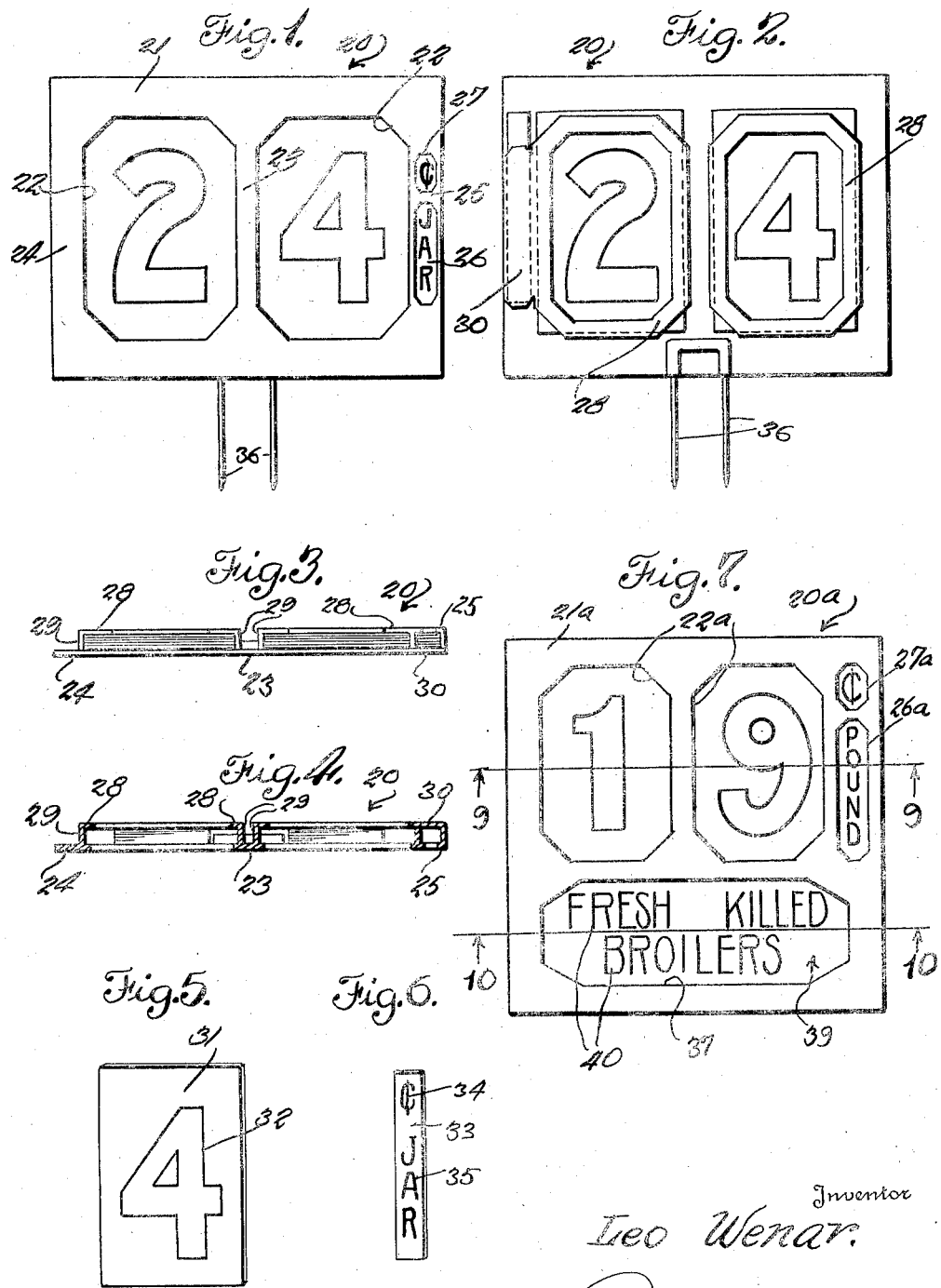
Inventor
Leo Wenar.

Aug. 28, 1934.  L. WENAR  1,971,738
UNIT PRICING OR LETTERING SYSTEM AND CARD DISPLAY HOLDER
Filed May 1, 1933  3 Sheets-Sheet 2
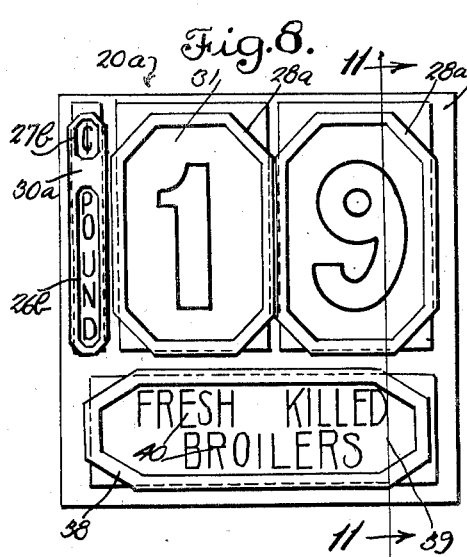
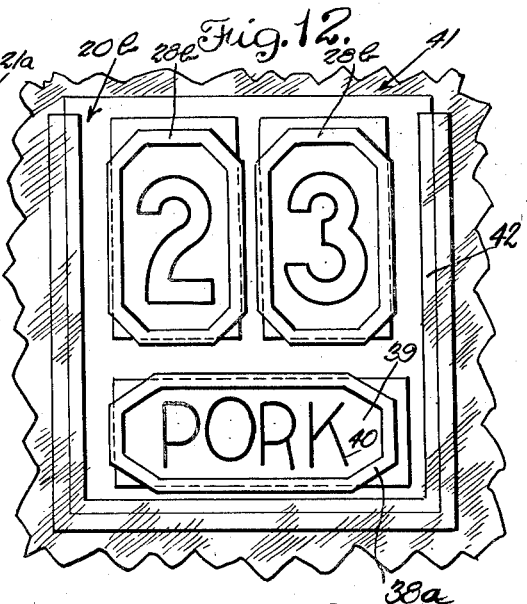
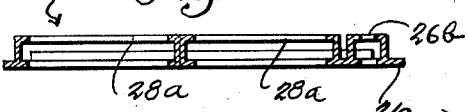
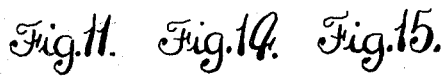
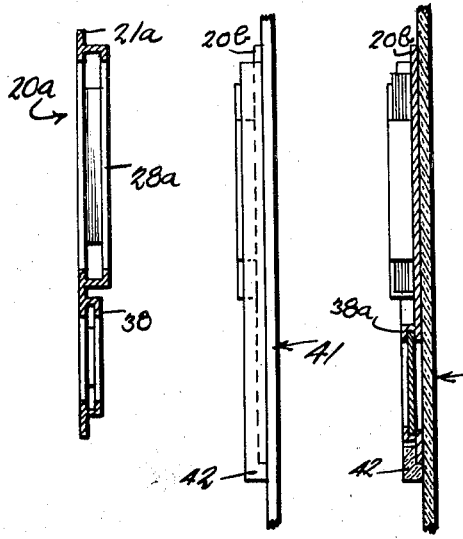
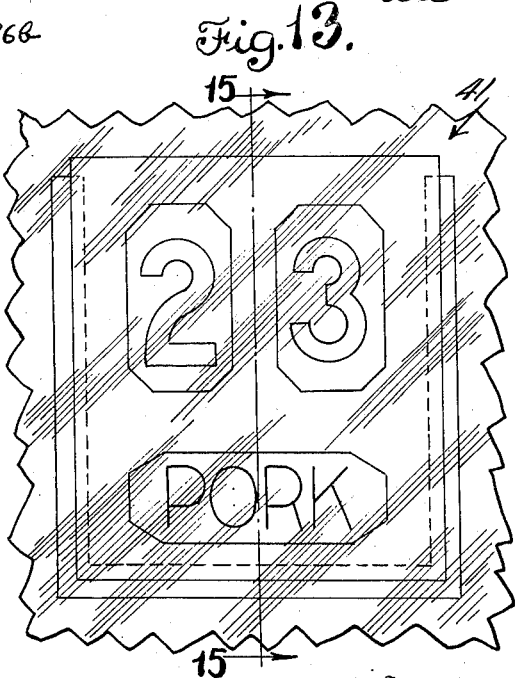
Inventor
Leo Wenar.

Aug. 28, 1934. L. WENAR 1,971,738
UNIT PRICING OR LETTERING SYSTEM AND CARD DISPLAY HOLDER
Filed May 1, 1933 3 Sheets-Sheet 3
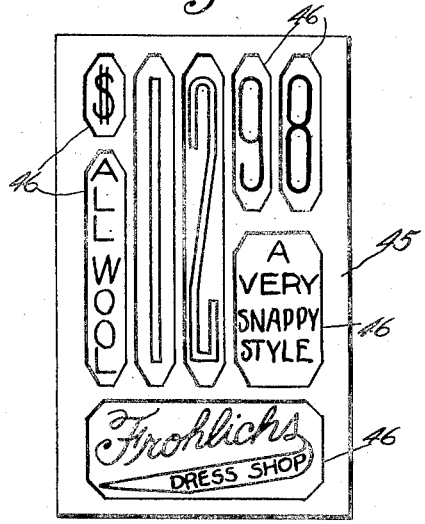
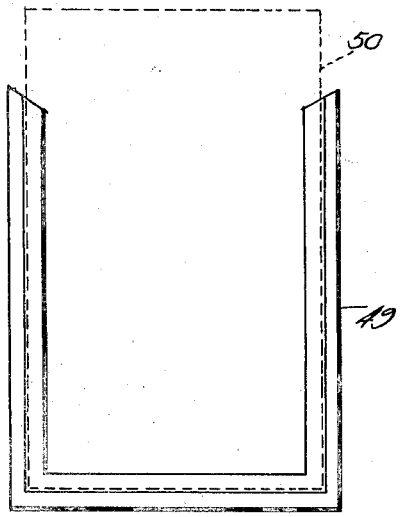
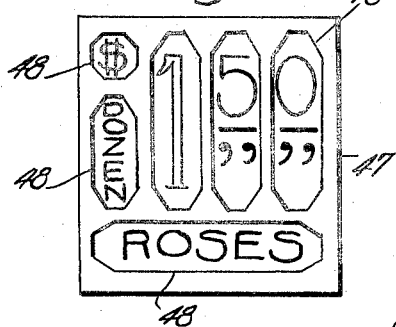
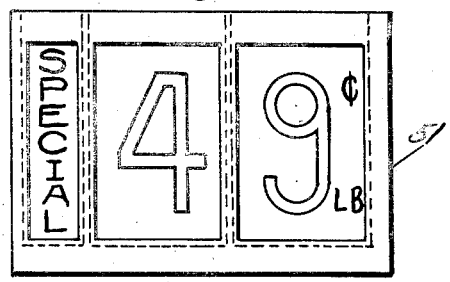
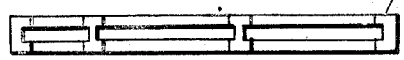
Inventor
Leo Wenar
By Bryant & Lowry
Attorneys Patented Aug. 28, 1934

1,971,738

UNITED STATES PATENT OFFICE 1,971,738

UNIT PRICING OR LETTERING SYSTEM AND CARD DISPLAY HOLDER

Leo Wenar, New York, N. Y.

Application May 1, 1933, Serial No. 668,840

2 Claims. (Cl. 40—5)

This invention relates to certain new and useful improvements in unit and lettering systems and card display holders.

The primary object of the invention is to provide a unit pricing or lettering system and card display holder for pricing and advertising of merchandise in a compact and economical as well as practical form, either in separate units of prices or lettering, or in combinations of both, the invention comprising a holder with one or more pockets or compartments for the sliding reception of a single or plurality of unit pricing or lettering insert cards or tickets or other inserts or cards, advertising, or designating certain kinds of merchandise, the novel system comprising a holder for complete sets of inserts, tickets, or cards to be permanently carried thereby, and relatively interchangeable for display purposes to show different prices for merchandise or commodities of any character, also descriptive inserts, cards or tickets, or display show cards in a multiple of holders making a complete combination in one holder.

It is a further object of the invention to provide a card display holder of the foregoing character constructed of any suitable material desired such as celluloid, glass, wood, or wood pulp, card board, papier mâché, metals of various kinds, fibrous materials, leather or the like, and the holder may carry a mounting member when necessary, such as an attached pin or hook, or can be placed on an easel form, or the same can be attached by a chemical process, or moulded in as a part of a glass show case, or the glass in a show window, also any items of glass, also as a part of a neon or electric display sign, or display or advertising fixtures, menu cards, business, church, or building directory boards, restaurant, cafeteria, or luncheon menu boards or description of the food, and at the price to be sold.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view of a price and quantity display holder constructed in accordance with the present invention, provided with an attached pin, and displaying the price of an article of merchandise by means of numbered and lettered inserts carried by the holder;

Figure 2 is a rear elevational view of the card display holder as shown in Figure 1, disclosing the same price of the article on the opposite side of the holder, which enables the sales person to know the price quoted on the face of the holder without removing the same;

Figure 3 is a top edge elevational view showing the compartment for the sliding reception of relatively interchangeable price tickets or the inserts;

Figure 4 is a longitudinal sectional view of the holder;

Figure 5 is a perspective view of one of the price inserts;

Figure 6 is a perspective view of one of the inserts disclosing the symbol ¢, and the quantity offered at the price;

Figure 7 is a front elevational view of another form insert display holder disclosing the character of merchandise and the price per pound;

Figure 8 is a rear elevational view of the card display holder shown in Figure 7, and disclosing similar information upon the rear side of the holder;

Figure 9 is a horizontal sectional view taken on line 9—9 of Figure 7;

Figure 10 is a horizontal sectional view taken on line 10—10 of Figure 7;

Figure 11 is a vertical sectional view taken on line 11—11 of Figure 8;

Figure 12 is a rear elevational view of another form of insert or card display holder associated with the glass of a show case or show window;

Figure 13 is a front elevational view of the insert or card holder as shown in Figure 12 viewable through the glass of a show case or show window;

Figure 14 is a side elevational view of the insert or card display holder shown in Figure 12;

Figure 15 is a vertical cross-sectional view taken on line 15—15 of Figure 13;

Figures 16 to 19 show front elevational views of other forms of the invention;

Figure 20 is an upper edge elevational view of the form of invention shown in Figure 14;

Figure 21 is a front elevational view of another form of insert holder especially designed for attachment to shelving; and Figure 22 shows a holder with a single opening displaying units, symbol and quantity.

The inserts, cards or tickets, and the display holder may be constructed of any material desired and the same may be constructed in any size, form, depth in opening or configuration prepared, and any multiple thereof, but for purposes of illustrating the invention only, the holder is shown to be of rectangular form. As illustrated in Figures 1 to 6, the insert or card display holder designated in general by the reference numeral 20 comprises a plate 21 having insert or card display windows or openings 22 with angle corners and having channels to retain the inserts or cards in the correct position for display from the front side, the windows or openings being arranged side by side and separated by intervening strips 23.

Figures 1 and 4 show on the plate of the holder two openings 27 and 26, one designating the ¢ symbol, the other quantity, these inserts being placed in the longitudinal slotted opening, as shown in Figure 3 at 25, and when placed with 22 of Figure 1. The openings 22, 26, 27 disclose by means of price and quantity inserts and tickets the cost of merchandise with which the holder is associated. The rear side of the holder 20 is shown in Figure 2 and the structure thereof for the support of price and other cards and inserts is also shown in Figures 3 and 4. Each opening 22 at the rear side of the holder 20 has a frame cut out and pressed into the form as shown from the face plate of Figure 1 and on Figure 2 by hydraulic or other pressure, and the complete holder is made in one piece, the frame thus made with the opening at the top acts as a receptacle that holds the inserts or cards in position to be permanently carried by the holder, and relatively interchangeable for the display of different prices for different quantities of merchandise, thus forming also a compartment rearwardly of the openings 22, 26, 27 of the plate 21 being designated by the reference numerals 28, 30, the compartments being open at the upper ends for the permanent reception of relatively interchangeable price and the quantity inserts, and symbol ¢ viewable through the openings 22, 26, 27. One of the price unit inserts is illustrated in Figure 5 designated by the reference character 31. With this system five price inserts can be carried by each frame 28 numbered respectively from 1 to 0, the odd numerals 1—3—5—7—9 on the one side, and the even numerals 2—4—6—8—0 on the opposite facing, so that with the insert display holder embodying two openings 22 any price combination can be made from 1¢ to 99¢ and displayed through the openings. As stated the inserts 31 are relatively interchangeable for the display of different prices, and the inserts 33 are similarly interchangeable for the display of different quantities, and the like as hereinbefore set forth. The insert or card display holder as shown in Figures 1 and 2 carries an attached double pin 36 to facilitate attachment of the holder to such articles for sale as meats, fruits, vegetables, fish and varied other merchandise for sale.

In the form of invention illustrated in Figure 7 to 11 the insert or card display holder 20a comprising the plate 21a has the opening 22a therein for the display of the inserts 31 and openings 26a and 27a for the display of the inserts 33. In this form of the invention, the lower part of the plate 21a below the opening 22a is provided with an opening 37 bordered on the rear side of the plate 21a as shown in Figure 8 by a frame 38 stamped into this form and shape on the face of the plate as shown in Figure 7, opening 37 thus forming the frame 38 open at one end for the sliding reception of the display inserts 39 carrying upon the faces thereof printed matter 40 descriptive of a certain class of merchandise that is sold at the price quoted 19¢ pound.

The rear side of the plate 21a has the opening 22a therein bordered by the frame 28a while the openings 26a and 27a at the rear side of the plate 21a have a frame 30a provided with openings 26b and 27b registering respectively with the opening 26a and 27a of the plate 21a so that the insert 33 placed in frame 30a together with the inserts 31 and 39 will be readable from the opposite sides of the insert or card display holder.

It shall be a part of this invention where there is no necessity for the inserts of the price, quantity, and descriptive cards to show on the rear of the holder the back of the holder will in such cases be of solid construction eliminating the frame openings, and leaving only the face openings as shown on plate fronts of Figures 1, 7 and 13 with openings in the pockets at the rear of the holder at the top or sides as may be necessary for the reception of the inserts or cards as shown in Figure 9 at 28a and 21a and in Figure 11 at 38.

In the form of invention illustrated in Figures 12 to 15, the card and insert display holder is associated with the glass 41 of a show case, show window or the like, having a celluloid channel guide 42 cemented on the glass by a chemical process or otherwise secured to the inner side or moulded in as a part thereof for the sliding reception of the insert or card display holder 20b that is of a construction similar to the form of holder illustrated in Figures 7 to 11 except that the openings, 26a and 27a have been omitted, but can be a part of any holder to be used in connection with price display holders used on the glass of any show window, or show cases. The holder 20b is provided with openings for the display of price unit inserts or cards 31, different combinations or groups of which inserts or cards are retained in position by the frame 38a.

In the form of invention illustrated in Figure 16, the display card or insert holder 45 is provided with a plurality of openings 46 for the display of inserts disclosing the character and descriptive matter of articles of merchandise, the cost thereof in dollars and cents and the name of the merchant.

In Figure 17 a display card or insert holder 47 has a plurality of openings 48 displaying cost of articles in dollars and cents by quantity and the character of article.

The card holder 49 as shown in Figure 18 is of substantially U-shape and of channelled formation for the sliding reception of a card 50. The holder 49 may be constructed of any material desired, such as pyroxylin or glass and may be secured in any suitable manner to a window glass of a restaurant or the like or the glass cover of a refrigerating or other show case for the display of menus, advertising matter, price quotations and the like.

In Figures 19 and 20, the display or insert holder 51 has a series of openings forming pockets for the sliding reception of price and descriptive cards with one card carrying a price numeral, cent symbol and identifying quantity, such as lb.

The display card or insert holder 52 shown in Figure 21 especially designed for attachment to shelving, has a series of horizontally aligned openings for the individual display of letter cards to form words and price unit insert cards.

The holder 53 shown in Figure 22 contains a card or insert carrying unit price, the cent symbol and associated quantity.

From the above detailed description of the invention, it is believed that the construction and operation thereof will at once be apparent, it being noted that the pricing and lettering system and the card display holder is readily adaptable for uses of pricing and describing the merchandising of articles and the quantity that each price secures, making of it a practical item of use in every class of mercantile business. Sets of cards are permanently carried by the holder, and are relatively interchangeable for various combinations and purposes eliminating the continual loss of such cards when in loose forms by careless employees. Several forms of the invention have been described as embodying a plate having a frame flange on one face, but it is to be understood that the pockets for holding the cards or inserts may be formed by a stamping, drawing, punching or pressing operation, or by molding and any character of material desired may be utilized in the manufacture of the holder.

While there are herein shown and described the preferred embodiments of the invention, it is nevertheless to be understood that minor changes may be made therein without departing from the spirit and scope of the invention as claimed.

I claim:—

1. In a unit pricing and lettering system and card display holder, a holder formed of a single plate having openings therein, frames on one side of the plate bordering the openings and including side and end frame bars, one of the end bars being spaced from the plate with the other end bar and side bars integral with the plate, diagonal corner bars connecting the side and end frame bars and spaced from the plate and inserts in the frames carrying price and descriptive data viewable through the openings.

2. In a unit pricing and card display holder, a plate having openings therein, frames on one side of the plate bordering the openings and including side and end frame bars, one of the end frame bars being spaced from the plate with the other end bar and side bars integral with the plate, diagonal corner bars connecting the side and end frame bars and spaced from the plate, and groups of price unit cards mounted in the frames with the cards relatively interchangeable for different price combinations.

LEO WENAR.